(12) United States Patent
Arakawa

(10) Patent No.: US 6,607,254 B2
(45) Date of Patent: Aug. 19, 2003

(54) HYDRAULIC BRAKE DEVICE

(75) Inventor: Haruo Arakawa, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 5 days.

(21) Appl. No.: 09/988,856

(22) Filed: Nov. 20, 2001

(65) Prior Publication Data

US 2002/0063470 A1 May 30, 2002

(30) Foreign Application Priority Data

Nov. 20, 2000 (JP) ........................................ 2000-353200

(51) Int. Cl.[7] ................................................. B60T 8/44
(52) U.S. Cl. ................................................... 303/114.3
(58) Field of Search ........................... 303/4, 31, 113.3, 303/114.1, 114.2, 114.3, 115.1; 60/553; 91/369.2

(56) References Cited

U.S. PATENT DOCUMENTS

| | | | |
|---|---|---|---|
| 3,559,406 A | | 2/1971 | Gardner |
| 3,972,191 A | * | 8/1976 | Grabb .......................... 60/553 |
| 4,862,787 A | * | 9/1989 | Suzuki et al. ............... 91/369.2 |
| 5,263,398 A | * | 11/1993 | Kobayashi et al. .......... 91/369.2 |
| 5,873,296 A | * | 2/1999 | Shirahata et al. ........... 91/369.2 |

* cited by examiner

Primary Examiner—Christopher P. Schwartz
Assistant Examiner—Xuan Lan Nguyen
(74) Attorney, Agent, or Firm—Burns, Doane, Swecker & Mathis, LLP

(57) ABSTRACT

A hydraulic brake device which enables an accurate increase in the braking force after reaching the boosting limit of a brake booster includes a cylinder, a master piston, a floating piston, a master pressure chamber defined by the cylinder, the master piston and the floating piston, a brake pressure chamber defined by the cylinder and the floating piston, and a valve disposed in the master piston for establishing and interrupting a communication between the master pressure chamber and a reservoir tank. In addition, a valve actuating member is movable relative to the output member for opening the valve when moved by a predetermined amount relative to the output member in accordance with operation of the brake operation member, and a moving amount controlling mechanism reduces the relative movement of the valve actuating member in accordance with the increase of the operation force by the brake operating member.

15 Claims, 4 Drawing Sheets

HYDRAULIC BRAKE DEVICE

CROSS REFERENCE TO RELATED APPLICATIONS

This application is based on and claims priority under 35 U.S.C. §119 with respect to Japanese Application No. 2000-353200 filed on Nov. 20, 2000, the entire content of which is incorporated herein by reference.

1. Field of the Invention

The present invention generally relates to a hydraulic brake device. More particularly, the present invention pertains to a hydraulic brake device for a vehicle having a brake booster.

2. Background of the Invention

A known hydraulic brake device is disclosed in U.S. Pat. No. 3,559,406. This known hydraulic brake device includes a larger diameter piston and a smaller diameter piston. The larger diameter piston is moved by a power piston of a vacuum brake booster that is boosted by vacuum pressure generated by an engine when a brake pedal is operated. The smaller diameter piston is positioned in an inner periphery of the larger diameter piston and is movable relative to the larger diameter piston when the boosting function of the vacuum brake booster fails.

With the construction of the aforementioned hydraulic brake device, when the boosting function of the vacuum brake booster fails, an appropriate braking force can be ensured because the brake pressure can be obtained by the smaller diameter piston and the pressure increase gradient thereof can be greater than the brake pressure obtained by the larger diameter piston. However, the braking force cannot be increased after the brake booster reaches the boosting limit.

A need thus exists for a hydraulic brake device which enables an accurate increase in the braking force after reaching the boosting limit of the brake booster.

SUMMARY OF THE INVENTION

In light of the foregoing, the present invention provides a hydraulic brake device which includes a cylinder, a master piston movable in the cylinder in response to operation of an output member of a brake booster in accordance with operation of a brake operation member, a floating piston having a smaller diameter than the master piston and being engaged with the master piston and movable relative to the master piston, a master pressure chamber defined by the cylinder, the master piston and the floating piston, a brake pressure chamber defined by the cylinder and the floating piston, and a valve disposed in the master piston for establishing and interrupting communication between the master pressure chamber and a reservoir tank. A valve actuating member is movable relative to the output member for opening the valve when the valve actuating member is moved by a predetermined amount relative to the output member in accordance with operation of the brake operation member, and a moving amount controlling mechanism reduces the relative movement of the valve actuating member with respect to the output member in accordance with an increase of the operation force by the brake operating member.

According to another aspect of the invention, a hydraulic brake device includes a vacuum booster which boosts an operation force applied to a brake operation member and has an output member and a deformable reaction disk mounted in the output member, a cylinder, a master piston movable in the cylinder in response to operation of the output member of the vacuum booster, and a floating piston positioned in the cylinder and engaged with the master piston, with the floating piston having a diameter that is smaller than the diameter of the master piston and being movable relative to the master piston. A master pressure chamber is defined by the cylinder, the master piston and the floating piston, and a brake pressure chamber is defined by the cylinder and the floating piston. A valve is disposed in the master piston and is adapted to be open to permit communication between the master pressure chamber and a reservoir tank and is adapted to be closed to prevent communication between the master pressure chamber and the reservoir tank. A projecting pin is movable relative to the output member in accordance with operation of the brake operation member to open the valve when the valve projecting pin is moved by a predetermined amount relative to the output member in accordance with operation of the brake operation member. A space provided between the output member and an outer periphery of the reaction disk receives a portion of the reaction disk when the reaction disk is deformed during increased operation force by the brake operating member to reduce movement of the projecting pin relative to the output member.

BRIEF DESCRIPTION OF THE DRAWING FIGURES

The foregoing and additional features and characteristics of the present Invention will become more apparent from the following detailed description considered with reference to the accompanying drawing figures in which like reference numerals designate like elements.

DETAILED DESCRIPTION OF THE INVENTION

Figure 1:
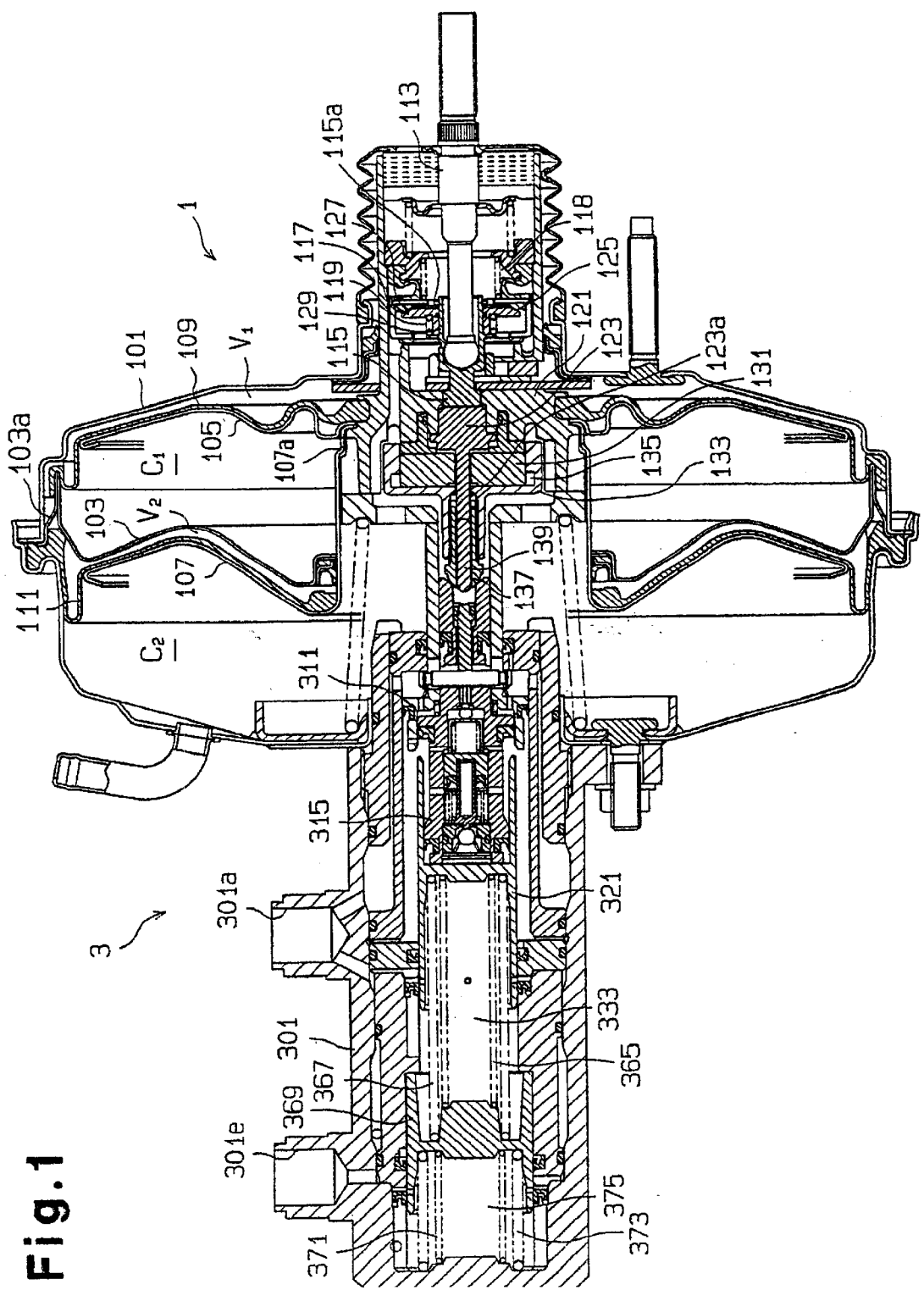
FIG. 1 is a cross-sectional view of a hydraulic brake device according to an embodiment of the present invention.

As shown in FIG. 1, a brake booster 1 for boosting the brake operation force using the vacuum pressure generated by an engine is connected with a master cylinder 3 for generating the hydraulic brake pressure in accordance with the brake operation force. The brake booster 1 includes a housing 101 having a fixed partition wall 103, movable walls 105, 107, and diaphragms 109, 111 to form two variable pressure chambers V1, V2, in which the amount of introduced atmospheric air varies in accordance with the brake pedal operation, and two constant pressure chambers C1, C2 which are always connected with the engine so that vacuum pressure is introduced into the constant pressure chambers C1, C2.

The constant pressure chambers C1, C2 are in communication with each other via an air passage 107a provided on the movable wall 107. The variable pressure chambers V1, V2 are in communication with each other via an air passage 103a provided on the fixed partition wall 103.

An input rod 113 is connected with a brake pedal for outputting the operational force of the brake pedal. An air piston 115 is secured to the forward end of the input rod 113 and operates together with the input rod 113. The air piston 115 is disposed with an outer periphery of an air valve 117. A spring 119 is provided between the air piston 115 and the air valve 117. A stopper ring 115a is provided on the air piston 115.

An end of the air piston 115 is positioned in a power piston 121 to contact an intermediate rod 123 also disposed in the power piston 121. The power piston 121 is connected to the movable walls 105, 107. An air valve seal 127 is provided on a valve retainer 125 and contacts the valve 117 to interrupt communication between the brake booster 1 and the atmosphere when the braking force is not generated (i.e., when the brake pedal is not depressed). A control valve seal 129 is provided on the valve retainer 125. When the braking force is not generated as shown in FIG. 1, a clearance is maintained between the control valve seal 129 and the power piston 121 to maintain communication between the variable pressure chambers V1, V2 and the constant pressure chambers C1, C2. The valve retainer 125 is always biased in the left direction by a spring 118.

A reaction disc 131 is provided on the power piston 121, and an output rod 133 is provided on the reaction disc 131. As shown in FIG. 1, a space 135 enclosed by the reaction disc 131 and the output rod 133 is provided at a position outwardly of the outer peripheral portion of the reaction disc 131. A first rod 137 is secured to the output rod 133. A projecting pin 139 constituting a valve actuating member is provided in the first rod 137 for relative movement with the first rod 137. The projecting pin 139 contacts an extended portion 123a of the intermediate rod 123 that penetrates or extends through the reaction disc 131.

Figure 2:
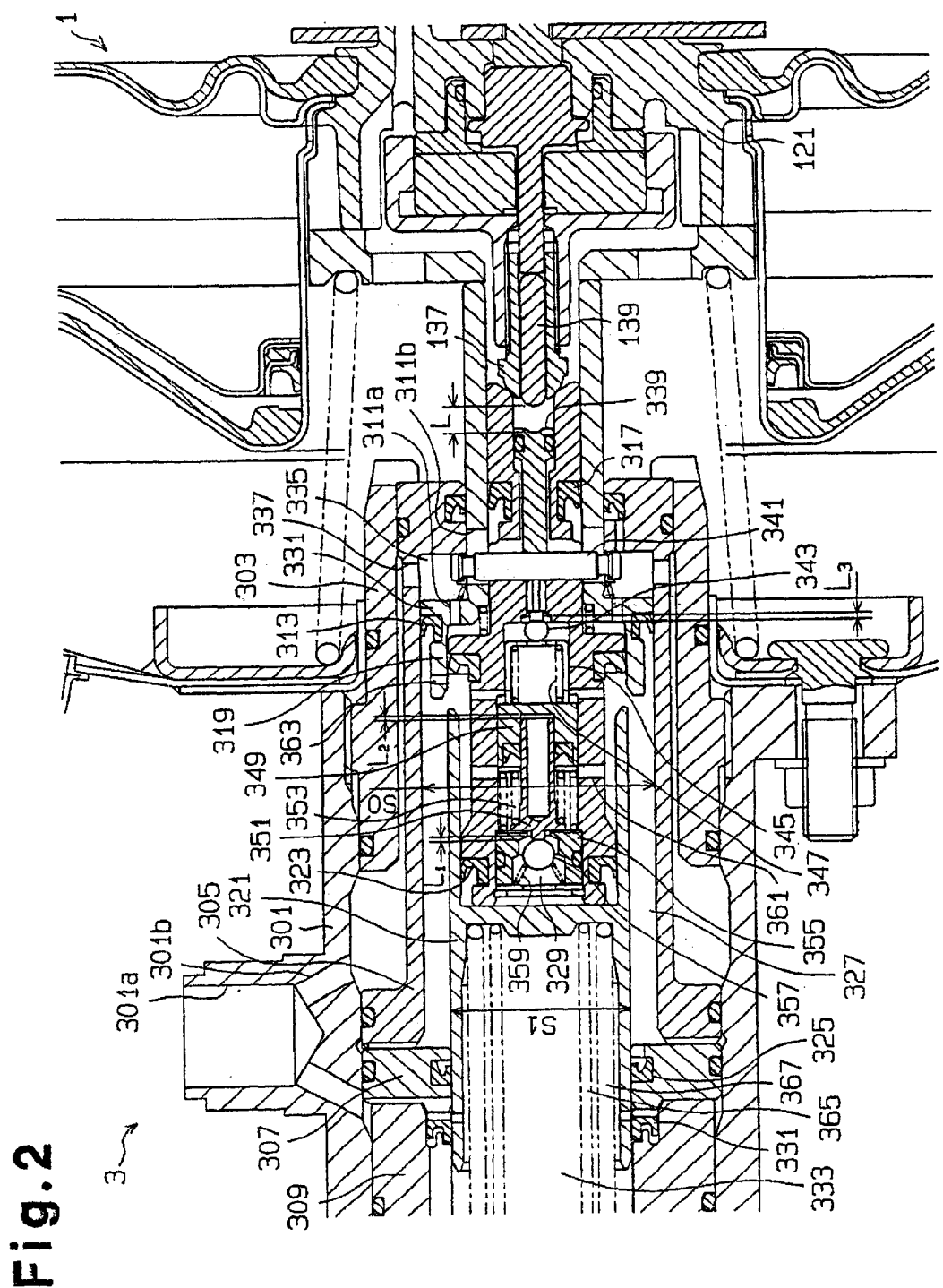
FIG. 2 is an enlarged cross-sectional view of a portion of the hydraulic brake device according to the present invention.

FIG. 2 illustrates the structure of the master cylinder 3. The master cylinder 3 includes a cylinder body 301 which is fluid-tightly provided with a first body piece 303, a second body piece 305, a third body piece 307, and a fourth body piece 309. A larger diameter piston 311 (labeled in FIG. 1) constituting a master piston is slidably positioned in the second body piece 305. A first seal 313 is provided between the second body piece 305 and the larger diameter piston 311. A smaller diameter piston 315 (labeled in FIG. 1) constituting the master piston along with the larger diameter-piston 311 is provided in the larger diameter piston 311 for relative movement with the larger diameter piston 311. A second seal 317 and a third seal 319 are provided between the larger diameter piston 311 and the small diameter piston 315. The front portion of the smaller diameter piston 315 is disposed in a first floating piston 321 for movement relative to the first floating piston 321. A fourth seal 323 is provided between the first floating piston 321 and the smaller diameter piston 315.

A fifth seal 325 is provided between the third body place 307 and the first floating piston 321. A first pressure chamber 327 is formed by the second body piece 305, the larger diameter piston 311, and the smaller diameter piston 315. A second pressure chamber 329 is formed between the smaller diameter piston 315 and the first floating piston 321. A sixth seal 331 is provided between the fourth body piece 309 and the first floating piston 321. A third pressure chamber 333 is formed on the left side of the floating piston 321 as shown in FIGS. 1 and 2. The hydraulic pressure generated in the third pressure chamber 333 is applied to one of the wheel brake systems by establishing communication between the third pressure chamber 333 and the wheel brakes.

Inlet ports 301a, 301e (shown in FIG. 1) are provided on the cylinder body 301 and are connected to a reservoir tank which is in communication with the atmosphere. A port 311a is provided on the larger diameter piston 311 and is in communication with the inlet port 301 a via a relief chamber 335 enclosed by the larger diameter piston 311 and the second body piece 305, a port 337 provided on the second body piece 305, and a port 301b provided on the cylinder body 301.

Figure 3:
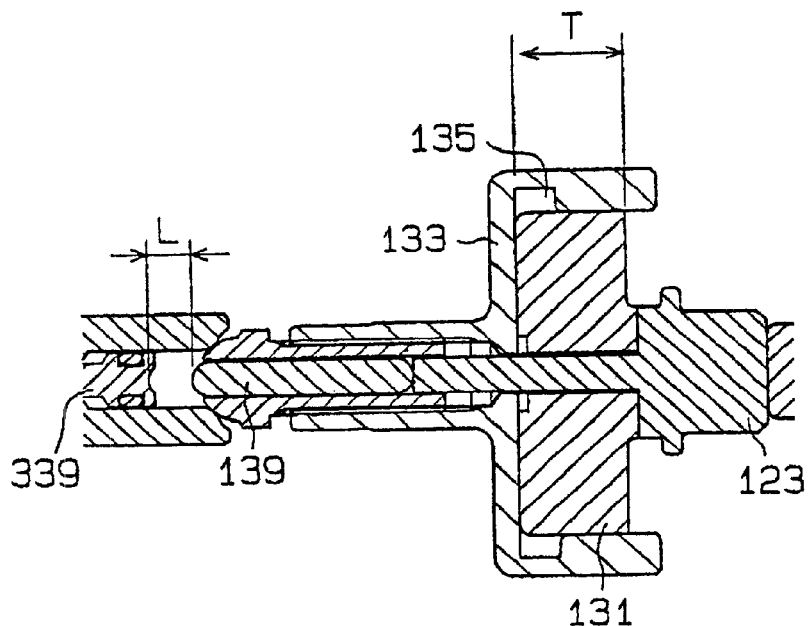
FIG. 3 is a cross-sectional view of the reaction disc used in the hydraulic brake device of the present invention.

The smaller diameter piston 315 contacts the first rod 137 of the brake booster 1. A second rod 339 is provided in the rear end portion of the smaller diameter piston 315 for movement relative to the smaller diameter piston 315. The second rod 339 is adapted to contact the projecting pin 139 while maintaining a clearance L relative to the projecting pin 139 of the brake booster 1 when the braking force is not generated as shown in FIG. 3.

A stopper pin 341 is positioned in a penetrated bore 311b of the larger diameter piston 311 and contacts the left surface or forward end of the second rod 339. Both ends of the stopper pin 341 contact the second body piece 305. A first valve 343 constituting is provided in the small diameter piston 315. The first valve 343 is biased in the right direction of FIG. 2 by the biasing force associated with a first spring 347 via a retainer 345. Because the first valve 343 contacts the left surface of the stopper pin 341 when the braking force is not generated, a valve seat surface of the smaller diameter piston 315 and the first valve 343 are separated from one another. Thus, in this case, the first pressure chamber 327 establishes communication with the reservoir tank via the relief chamber 335, the port 337, the port 301b, and the inlet port 301a to maintain the atmospheric pressure.

The left side of the retainer 345 in FIG. 2 contacts an intermediate member 349. In the intermediate member 349, a lift member 351 which is relatively movable is biased in the left direction by a second spring 353. A second valve 357 is biased to the right of FIG. 2 by a third spring 359 in a valve seat member 355 disposed in the smaller diameter piston 315. Because the lift member 351 contacts the second valve 357 by being biased in left direction by the second spring 353 when the braking force is not generated, the second valve 357 and the valve seat member 355 are separated from one another, maintaining a clearance L1. A clearance L2 is also formed between the lift member 351 and the intermediate member 349. L1 is greater than L2 when the braking force is not generated. The retainer 345, the intermediate member 349, and the lift member 351 constitute a valve interlock means 352.

A port 361 is formed on the smaller diameter piston 315 and a port 363 is formed on the larger diameter piston 311. The first floating piston 321 receives a predetermined biasing force from return springs 365, 367 which are provided between a second floating piston 369 (shown in FIG. 1) and the first floating piston 321. Also, return springs 371, 373 are provided between the second floating piston 369 and the cylinder body 301. As shown in FIG. 1, a third pressure chamber 375 which is connected to the other wheel brake system is formed by the second floating piston 369 and the cylinder body 301.

The operation of the hydraulic brake device according to the disclosed embodiment of the present invention is as follows. When the vacuum pressure generated by the engine is normally supplied to the brake booster 1, the constant pressure chambers C1, C2 are always under vacuum pressure. When the brake force is generated, the air piston 115 is moved to the left of FIG. 1 by the force transmitted from the input rod 113. The air valve 117 is thus moved in the leftward or forward direction. The valve retainer 125 is biased in left direction by the spring 118 and so the valve retainer 125 is moved along with the air valve seal 127 and the control valve seal 129. Accordingly, the control valve seal 129 contacts the power piston 121 to close the valve and interrupt communication between the variable valve chambers V1, V2 and the constant pressure chambers C1, C2. When the air piston 115 is further moved in the leftward or forward direction, the air valve 117 is separated from the valve seal 127 to open the valve. Atmospheric air is then introduced into the variable pressure chambers V1, V2. Accordingly, a differential pressure is generated between the variable pressure chambers V1, V2 and the constant pressure chambers C1, C2. The movable walls 105, 107 are thus moved to the left along with the power piston 121 by virtue of the boosting force associated with the pressure differential.

The brake operation force applied to the air piston 115 is applied to the reaction disc 131 along with the boosting force to the power piston 121 via the intermediate rod 123. Thus, the brake operation force is transmitted to the output rod 133 and the first rod 137, and the first rod 137 pushes the smaller diameter piston 315 in the leftward or forward direction in FIGS. 1 and 2. Simultaneously, the power piston 121 of the brake booster 1 pushes the larger diameter piston 311 to move the larger diameter piston 311 in the leftward or forward direction in FIGS. 1 and 2. Accordingly, the larger diameter piston 311 and the smaller diameter piston 315 are moved as a unit in the leftward or forward direction in FIGS. 1 and 2.

In this case, because the smaller diameter piston 315 is moved in the leftward direction relative to the stopper pin 341, the stopper pin 341 releases the first valve 343, and the first valve 343 is opened due to the spring biasing force of the first spring 347. That is, the communication between the first pressure chamber 327 and the reservoir tank is interrupted to generate the hydraulic pressure in the first pressure chamber 327 in accordance with the operation of the larger diameter piston 311 and the smaller diameter piston 315. The seal effective cross-section S0 of the larger diameter piston 311 is larger than the seal effective cross-section S1 of the first floating piston 321. Thus, as the forward movement of the larger diameter piston 311 is performed, the first floating piston 321 is moved forward longer than the forward moving distance of the larger diameter piston 311. Thus, the second pressure chamber 329 is gradually expanded. While maintaining these conditions, the smaller diameter piston 315 and the first floating piston 321 move while moving relative to each other. In accordance with the movement of the first floating piston 321, the hydraulic pressure is generated in the third pressure chamber 333. The second floating piston 369 is thus moved in leftward or forward direction of FIG. 1 to generate the hydraulic pressure in the third pressure chamber 375. Accordingly, the brake pressure is applied to each wheel brake system. This condition is shown as line A of FIG. 5. At the initial stage of the brake operation, the hydraulic pressure received by the lift member 351 in the first pressure chamber 327 is smaller than the biasing force of the second spring 353. Thus, the lift member 351 contacts the second valve 357 and the second valve 357 is opened.

In accordance with the movement of the smaller diameter piston 315 and the larger diameter piston 311, the hydraulic pressure in the first pressure chamber 327 is increased. When the hydraulic pressure in the first pressure chamber 327 exceeds a predetermined pressure (i.e., an arbitrary pressure before reaching the boosting limit of the brake booster), that is when the hydraulic pressure biasing the lift member 351 to the right overcomes the biasing force of the second spring 353, the lift member 351 moves to the right relative to the valve seat member 355, and the second valve 357 is closed by the biasing force of the third spring 359. Accordingly, the second pressure chamber 329 becomes a hermetically sealed space which is filled with the brake fluid. While maintaining the second pressure chamber 329 in this condition, the smaller diameter piston 315 and the floating piston 321 are moved as one unit.

Figure 4:
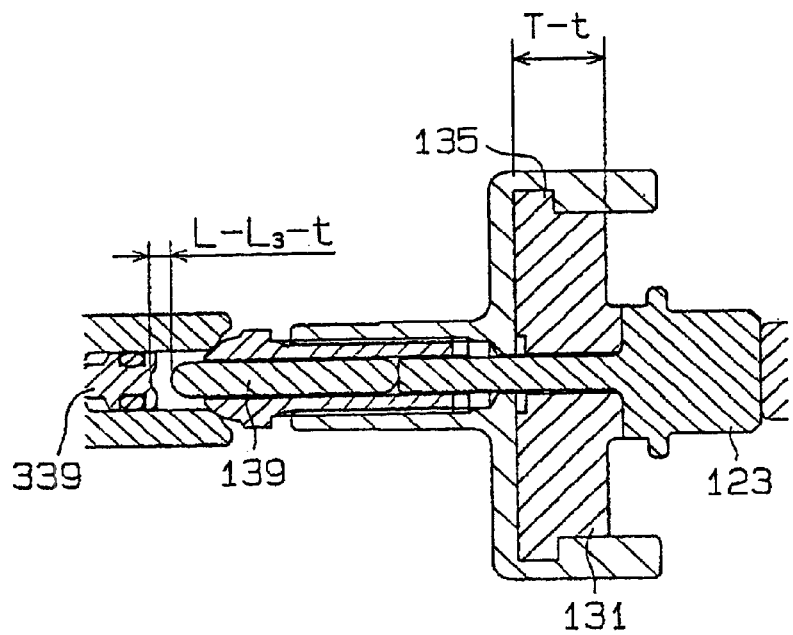
FIG. 4 is another cross-sectional view of the reaction disc used in the hydraulic brake device of the present invention.

When the brake operation force is relatively small at the initial stage of brake operation, the clearance between the projecting pin 139 and the second rod 339 maintains L–L3 (where L3 corresponds to the valve lift amount when the valve 343 is opened). Thus, the first valve 343 is not undesirably opened by the second rod 339 even when a sudden brake operation is performed. Then, when the brake operation force applied from the intermediate rod 123 and the boosting force applied from the power piston to the reaction disc 131 are increased and the hydraulic pressure in the first pressure chamber 327 reaches the aforementioned predetermined pressure, the pressure generated in the reaction disc 131 is increased. Thus, as shown in FIG. 4, the reaction disc 131 is deformed and a part of the reaction disc 131 enters into the space 135 enclosed by the reaction disc 131 and the output rod 133. Accordingly, the thickness of the reaction disc 131 is reduced from T at the initial stage to T–t. In accordance with this decreased thickness of the reaction disc 131, the clearance between the second rod 339 and the projecting pin 139 at this time is reduced to L–L3–t.

When the brake operation force is further increased and the brake operation performed exceeds the boosting limit of the brake booster 1 (i.e., point "a" in FIG. 5), the projecting pin 139 is pushed by the increased amount of the brake operation force via the air piston 115 and the intermediate rod 123. The projecting pin 139 fills the clearance L–L3–t between the projecting pin 139 and the second rod 339, further moves in the leftward or forward direction of FIG. 2 relative to the first rod 137 and pushes the second rod 339. The second rod 339 opens the first valve 343. Communication is thus established between the first pressure chamber 327 and the reservoir tank via the relief chamber 335, the port 337, the port 301b and the inlet port 301a. The hydraulic pressure in the first pressure chamber 327 is thus decreased, and the reaction force of the larger diameter piston 311 and the smaller diameter piston 315 is decreased. Thus, the boosting force of the brake booster 1 exceeds the reaction force of the larger diameter piston 311 and the smaller diameter piston 315 to further push the larger diameter piston 311 and the smaller diameter piston 315. That is, the smaller diameter piston 315 unitary with the first floating piston 321 is further pushed. According to the brake operation after this, the pushing force of the smaller diameter piston 315 is increased following the hydraulic pressure decrease in the first pressure chamber 327 to increase the hydraulic pressure in the third pressure chambers 333, 375 (i.e., the seal effective cross-section S1) along the line B in FIG. 5.

Figure 5:
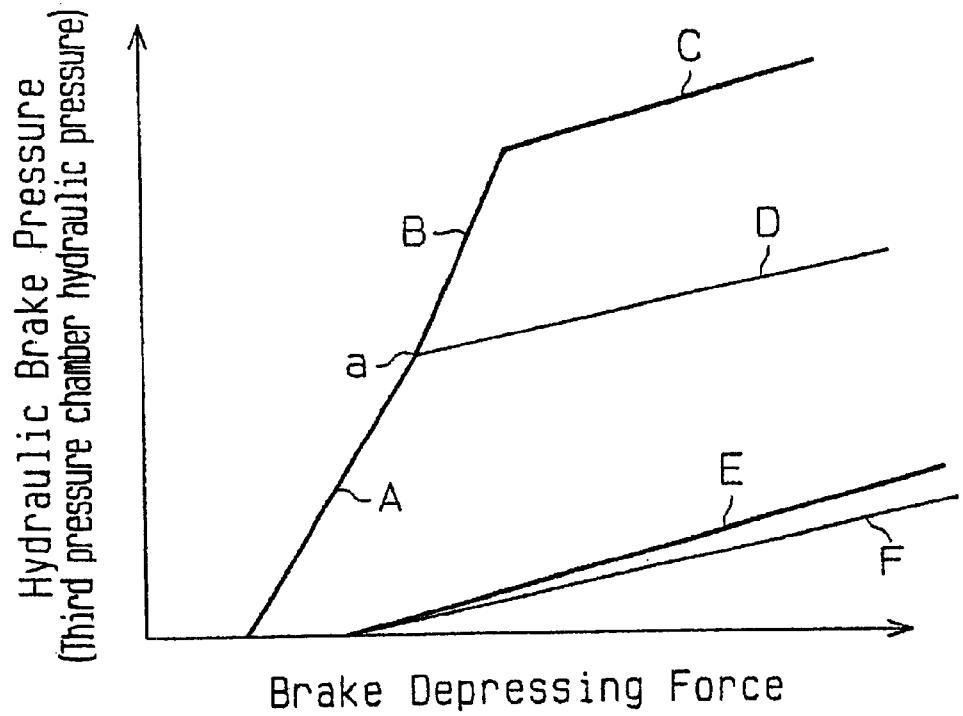
FIG. 5 is a graph for showing the relationship between the brake depressing force and the brake hydraulic pressure of the hydraulic brake device according to the present invention.

Line C in FIG. 5 shows the brake hydraulic pressure after the hydraulic pressure in the first pressure chamber 327 becomes equivalent to atmospheric pressure. In this case, because the opening and closing function of the first valve 343 no longer exists, the hydraulic brake pressure can be higher and the gradient can be steeper as compared to line D in FIG. 5 which is when the small diameter piston 315 receives the reaction force of the hydraulic pressure in the first pressure chamber 327.

The aforementioned structure for sealing the second pressure chamber with the brake fluid enclosed by the smaller diameter piston 315 and the first floating piston 321 is provided so that the smaller diameter piston 315 does not suddenly move forward when the first valve 343 is opened.

When the brake operation member is returned and the urging force in the rightward or rearward direction by the hydraulic pressure received by the lift member 351 becomes smaller than the biasing force of the second spring 353, the second valve 357 is opened by the lift member 351.

When the brake operation member is completely returned to the initial position, the first valve 343 is opened by the stopper pin 341 to establish communication between the first pressure chamber 327 and the atmosphere via the relief chamber 335, the port 337, the port 301b, and the inlet port 301a.

When the smaller diameter piston 315 returns to the initial position, the first valve 343 is moved in the leftward or forward direction and is opened by the stopper pin 341. In accordance with this operation, the retainer 345 which contacts the first valve 343 moves in the leftward or forward direction, and the intermediate member 349 moves in the leftward or forward direction. The intermediate member 349 pushes the lift member 351 to move and then the lift member 351 pushes the second valve 357. As mentioned before, because the clearance L2 between the intermediate member 349 and the lift member 351 is smaller than the lift amount L1 when the second valve 357 opens, the lift member 351 can open the second valve 357 by lifting the second valve at least by L1–L2 when the first valve 343 is opened.

When the vehicle motion control, for instance anti-skid control, is performed while the braking force is generated, the communication between the master cylinder 3 and the wheel brake is interrupted, and the brake fluid is circulated to the third pressure chamber 333 by the hydraulic pressure pump, the hydraulic pressure in the third pressure chamber 333 is increased and the hydraulic pressure in the second pressure chamber 329 enclosed by the first floating piston 321 and the small diameter piston 315 is increased by the balance of the hydraulic pressure to thus generate a force in the direction to open the second valve 357. However, the hydraulic pressure is not confined in the second pressure chamber 329 after opening the first valve 343 by the function of the valve interlock means 352.

In case the boosting function of the brake booster 1 by the vacuum pressure generated by the engine fails for some reason, the brake operation force applied to the input rod 113 is transmitted to the output rod 133 via the air piston 115, the intermediate rod 123, and the reaction disc 131. The output rod 133 pushes the small diameter piston 315 to move in the leftward of forward direction in FIG. 2. The third seal 319 provided on the small diameter piston 315 is moved in the leftward or forward direction in FIG. 2 relative to the port 363 of the larger diameter piston 311 by the relative movement of the smaller diameter piston 315 with respect to the larger diameter piston 315, and so communication between the first pressure chamber 327 and the reservoir tank is established via the port 363, the port 311a, the relief chamber 335, the port 301b, and the inlet port 301a.

Accordingly, the hydraulic pressure is not generated in the first pressure chamber 327 and the first floating piston 321 is moved by virtue of being pushed directly by the small diameter piston 315. Thus, the brake operation member receives the reaction force by the hydraulic pressure in the third pressure chamber 333 having the seal effective cross-section S1, with the hydraulic brake pressure thereof being shown as line E in FIG. 5. In this case, the hydraulic brake pressure can be higher compared to the case shown as line F in FIG. 5 in which the brake operation member receives the reaction force of the hydraulic pressure in the first pressure chamber 327 having the seal effective cross-section S0.

It is to be understood that the hydraulic brake device of the present invention is not limited to the specific details of the embodiment described above and illustrated in the drawing figures. For instance, the master cylinder for the hydraulic pressure brake device is not limited to a tandem type master cylinder, but is applicable to a single type master cylinder as well.

According to the hydraulic brake device of the embodiment, because the clearance between the pin 139 and the second rod 339 is ensured to be L–L3 when the brake operation force is relatively small before the boosting limit of the brake booster 1 is reached, the first valve 343 will not be undesirably opened by the pin 139 in thee vent of a sudden braking operation. Accordingly, the increase of the pedal stroke for generating a predetermined hydraulic pressure by accidental opening of the valve 343 can be prevented. In addition, the clearance between the pin 139 and the second rod 339 is reduced to L–L3–t by the function of the reaction disc 131, part of which is deformed and enters into the space 135 by the compression force when the hydraulic pressure in the first pressure chamber 327 reaches the predetermined pressure before reaching the boosting limit of the brake booster. Thus, the first valve 343 is securely opened after reaching the boosting limit to thereby appropriately increase the braking force after the boosting limit.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes, and equivalents which fall within the spirit and scope of the present invention as defined in the claims, be embraced thereby.

What is claimed is:

1. A hydraulic brake device comprising:

a cylinder;

a master piston movable in the cylinder in response to operation of an output member of a brake booster in accordance with operation of a brake operation member;

a floating piston having a smaller diameter than the master piston, the floating piston being engaged with the master piston and movable relative to the master piston;

a master pressure chamber defined by the cylinder, the master piston and the floating piston;

a brake pressure chamber defined by the cylinder and the floating piston;

a valve disposed in the master piston for establishing and interrupting communication between the master pressure chamber and a reservoir tank;

a valve actuating member movable relative to the output member for opening the valve when the valve actuating member is moved by a predetermined amount relative to the output member in accordance with operation of the brake operation member; and a moving amount controlling mechanism reducing the relative movement of the valve actuating member with respect to the output member in accordance with an increase of the operation force by the brake operating member.

2. The hydraulic brake device according to claim 1, wherein the brake booster comprises:

a power piston generating a boosting force in accordance with operation of the brake operation member; and a reaction disc disposed between the power piston and the output member for transmitting a reaction force in accordance with the boosting force to the brake operation member;

the moving amount controlling mechanism being formed by the reaction disc and a space provided around the reaction disc, with a part of the reaction disc being deformed and entering into the space by a compression force applied to the reaction disc in accordance with the increase of the brake operation force.

3. The hydraulic brake device according to claim 2, wherein the master piston comprises:

a larger diameter piston movable by the power piston of the brake booster; and a smaller diameter piston movably positioned in the larger diameter piston and movable by the output member;

the valve being disposed in the smaller diameter piston and the floating piston being movably outfitted to the smaller diameter piston.

4. The hydraulic brake device according to claim 3, wherein the master pressure chamber is a first master pressure chamber and the valve is a first valve, and further comprising:

a second master pressure chamber formed between the smaller diameter piston and the floating piston;

the smaller diameter piston comprising a second valve for controlling communication between the second master pressure chamber and the first master pressure chamber in accordance with a hydraulic pressure in the first master pressure chamber.

5. The hydraulic brake device according to claim 1, wherein a portion of the valve extends through a hole in the master piston and is engageable with a stopper pin to communicate the master pressure chamber with the reservoir.

6. The hydraulic brake device according to claim 1, including a spring biased retainer that engages the valve to urge the valve to a position interrupting the communication between the master cylinder chamber and the reservoir.

7. A hydraulic brake device comprising:

a vacuum booster which boosts an operation force applied to a brake operation member, the vacuum booster having an output member and a deformable reaction disk mounted in the output member;

a cylinder;

a master piston movable in the cylinder in response to operation of the output member of the vacuum booster, the master piston having a diameter;

a floating piston positioned in the cylinder and engaged with the master piston, the floating piston having a diameter that is smaller than the diameter of the master piston and being movable relative to the master piston;

a master pressure chamber defined by the cylinder, the master piston and the floating piston;

a brake pressure chamber defined by the cylinder and the floating piston;

a valve disposed in the master piston and adapted to be open to permit communication between the master pressure chamber and a reservoir tank and adapted to be closed to prevent communication between the master pressure chamber and the reservoir tank;

a projecting pin movable relative to the output member in accordance with operation of the brake operation member to open the valve when the valve projecting pin is moved by a predetermined amount relative to the output member in accordance with operation of the brake operation member; and a space provided between the output member and an outer periphery of the reaction disk, the space receiving a portion of the reaction disk when the reaction disk is deformed during increased operation force by the brake operating member to reduce movement of the projecting pin relative to the output member.

8. The hydraulic brake device according to claim 7, wherein the vacuum booster includes a power piston which generates the boost in the operation force, the reaction disc being disposed between the power piston and the output member for transmitting a reaction force.

9. The hydraulic brake device according to claim 8, wherein the master piston comprises:

a larger diameter piston movable by the power piston of the brake booster; and a smaller diameter piston movably positioned in the larger diameter piston and movable by the output member;

the valve being disposed in the smaller diameter piston and the floating piston being movably outfitted to the smaller diameter piston.

10. The hydraulic brake device according to claim 9, wherein the master pressure chamber is a first master pressure chamber, and including a second master pressure chamber formed between the smaller diameter piston and the floating piston.

11. The hydraulic brake device according to claim 10, wherein the valve is a first valve, the smaller diameter piston including a second valve controlling communication between the second master pressure chamber and the first master pressure chamber in accordance with a hydraulic pressure in the first master pressure chamber.

12. The hydraulic brake device according to claim 7, including a lift member movable positioned in the master piston and engageable with the second valve.

13. The hydraulic brake device according to claim 7, wherein the master piston includes a larger diameter piston and a smaller diameter piston movably positioned in the larger diameter piston.

14. The hydraulic brake device according to claim 7, wherein a portion of the valve extends through a hole in the master piston and is engageable with a stopper pin to open the valve and communicate the master pressure chamber with the reservoir.

15. The hydraulic brake device according to claim 7, including a spring biased retainer that engages the valve to urge the valve closed to prevent communication between the master cylinder chamber and the reservoir.

* * * * *